United States Patent
Patalacci et al.

(10) Patent No.: US 10,495,150 B2
(45) Date of Patent: Dec. 3, 2019

(54) WHEEL-HUB BEARING UNIT

(71) Applicant: Aktiebolaget SKF, Gothenburg (SE)

(72) Inventors: Ferdinando Patalacci, Rosta (IT); Carlo Maldera, Giaveno (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/982,011

(22) Filed: May 17, 2018

(65) Prior Publication Data

US 2018/0340573 A1 Nov. 29, 2018

(30) Foreign Application Priority Data

May 29, 2017 (IT) .................. 102017000058071

(51) Int. Cl.
*F16C 35/067* (2006.01)
*F16C 35/073* (2006.01)
*F16C 19/18* (2006.01)
*F16C 35/077* (2006.01)
*B60B 27/00* (2006.01)

(52) U.S. Cl.
CPC .......... *F16C 35/067* (2013.01); *F16C 19/183* (2013.01); *F16C 19/184* (2013.01); *F16C 19/186* (2013.01); *F16C 35/073* (2013.01); *F16C 35/077* (2013.01); *B60B 27/001* (2013.01); *B60B 27/0078* (2013.01); *F16C 2226/52* (2013.01); *F16C 2226/70* (2013.01); *F16C 2326/02* (2013.01)

(58) Field of Classification Search
CPC .... F16C 35/067; F16C 35/073; B60B 27/001; B60B 27/0078
See application file for complete search history.

(56) References Cited

U.S. PATENT DOCUMENTS

| | | | |
|---|---|---|---|
| 6,170,919 B1 * | 1/2001 | Hofmann | B60B 27/0005 301/105.1 |
| 6,705,762 B2 * | 3/2004 | Pilone | B60B 27/0005 384/537 |
| 7,927,021 B2 * | 4/2011 | Schumacher | F16C 35/067 384/537 |
| 9,272,575 B2 * | 3/2016 | Ravenna | B60B 27/0005 |
| 2003/0002762 A1 | 1/2003 | Kamura et al. | |
| 2004/0010916 A1 * | 1/2004 | Mazur | B60B 27/00 29/894.3 |
| 2012/0269475 A1 | 10/2012 | Maldera | |

* cited by examiner

*Primary Examiner* — Thomas R Hannon
(74) *Attorney, Agent, or Firm* — Garcia-Zamor Intellectual Property Law, LLC; Ruy Garcia-Zamor; Bryan Peckjian

(57) ABSTRACT

A unit forming a wheel-hub includes an outer bearing ring that is stationary and a flanged body that is directly connected to a pillar of a vehicle are provided with respective locking surfaces for locking the outer ring inside an assembly seat of the flanged body.

5 Claims, 1 Drawing Sheet

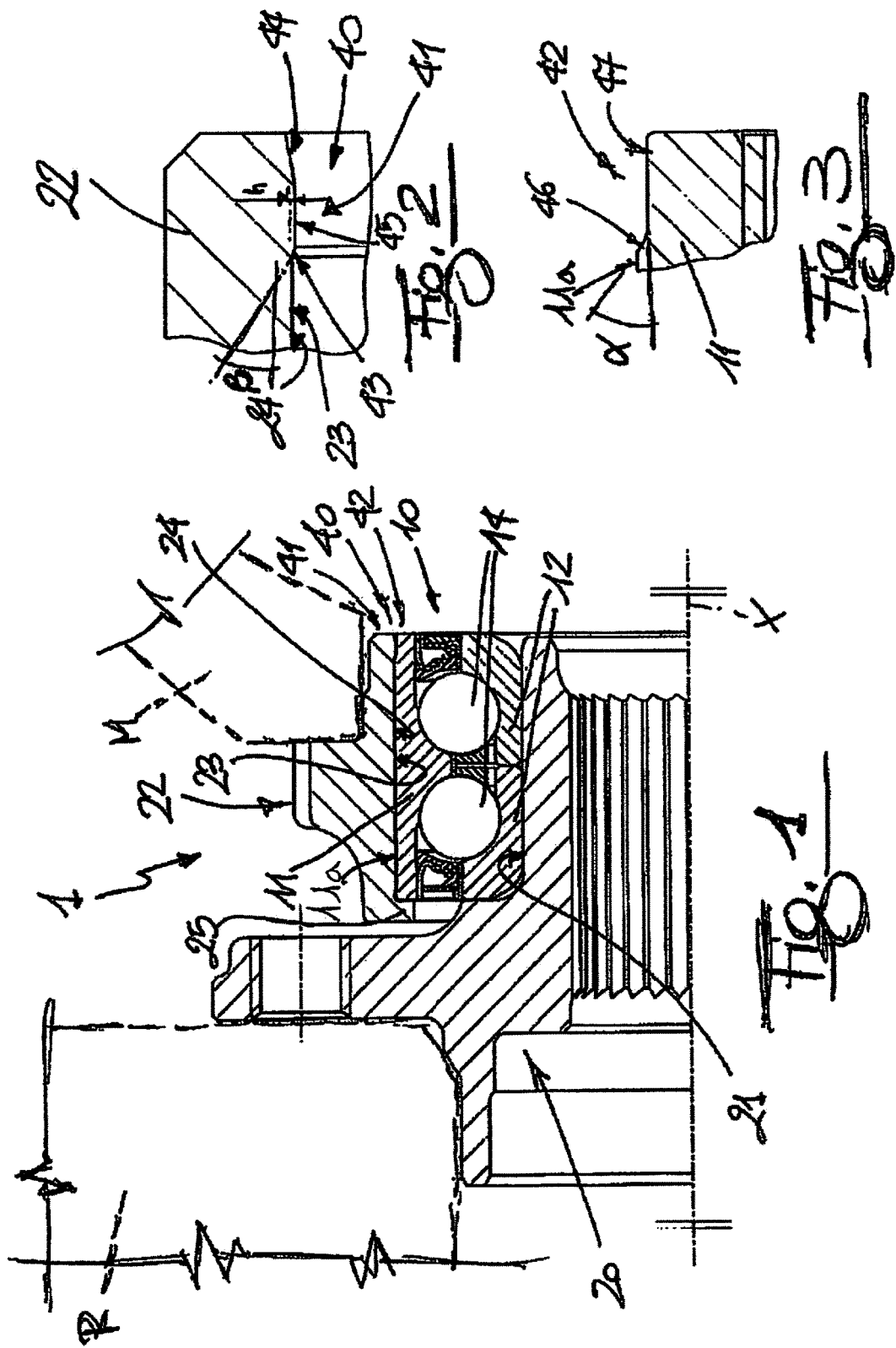

WHEEL-HUB BEARING UNIT

CROSS-REFERENCE

This application claims priority to Italian patent application no. 102017000058071 filed on May 29, 2017, the contents of which are fully incorporated herein by reference.

TECHNOLOGICAL FIELD

The present invention relates to a wheel-hub bearing unit.

BACKGROUND

Wheel-hub bearing units of the known type and in their simplest configuration comprise:
- an outer bearing ring which is stationary when in use and connected to a pillar of a vehicle;
- a pair of radially internal bearing rings which are not stationary when in use and are mounted axially alongside each other on a flanged wheel hub which can be connected when in use to a wheel of the vehicle; and
- two rings of rolling members interposed between the outer ring and the pair of radially internal bearing rings so as to rotatably and operatively connect the flanged wheel hub to the pillar of the vehicle.

The wheel-hub bearing units described above are of the first generation type, where the outer bearing ring is connected to the pillar by means of insertion of the outer ring itself inside a cylindrical housing seat created in the pillar itself and is axially locked inside the cylindrical housing seat either by means of cold-deformation of one or both the axial opposite ends of the outer ring adjacent to the pillar or by means of use of additional mechanical locking elements such as, for example Seeger rings, which must be coupled with the inner ring and then inserted, together with the inner ring, inside the cylindrical housing seat for locking together thereof.

Wheel-hub bearing units of the known type and in what is considered to be their more complex configuration comprise instead:
- an outer bearing ring which is stationary when in use and has an outer flange for connection thereof to a pillar of a vehicle;
- a central flanged hub and a bearing ring which are radially internal and not stationary when in use, the central flanged hub thereof being able to be connected, when in use, to a wheel of the vehicle, and the radially internal bearing ring being mounted integral with the central hub; and
- two rings of rolling members interposed between the outer ring and, respectively, between the central hub, on which a raceway for rolling members of the associated ring is directly formed, and the radially internal bearing ring, on which a further raceway for rolling members of the associated ring is formed.

The wheel-hub bearing units just described are, instead, of the third generation type and, if they offer undoubted technical advantages compared to the wheel-hub bearing units described above, i.e. those of the first generation type (advantages such as to be preferred by the OEM in the so-called "original equipment sector", i.e. during assembly on production vehicles), they do not appear to be sufficiently flexible and low-cost in terms of their use for the "aftermarket", i.e. in the so-called Vehicle Service Market.

In fact, if in "original equipment sector" the wheel-hub bearing units must have technical characteristics which take into account the whole life cycle of the vehicle on which they are mounted, in so-called "aftermarket", the wheel-hub bearing units must have technical characteristics which take into account only the remaining life cycle of the vehicle. Therefore, any simple replacement of a wheel-hub bearing unit of the third generation type with a similar wheel-hub bearing unit is not convenient, not only for the user of the vehicle, who would have to incur costs higher than those strictly necessary, but likewise for the spare parts manufacturer, who would also have to continue the production of the wheel-hub bearing units for vehicles which may not even be on the market any longer.

SUMMARY

The object of the present invention is therefore that of providing a wheel-hub bearing unit which, preferably, allows replacement in the event of maintenance of the wheel-hub bearing units of the third generation type, not only using the much more economical wheel-hub bearing units of the first generation type, but also with the possibility of using a small number of sizes of wheel-hub bearing units of the first generation type for a greater number of applications, resulting in an undoubted advantage both for the user of the vehicle, and for the spare parts manufacturer, who is no longer required to employ sophisticated and costly assembly systems such as those described above.

According to the present invention a wheel-hub bearing unit having the characteristic features described in the accompanying claims is provided.

BRIEF DESCRIPTION OF THE DRAWINGS

The invention will now be described with reference to the accompanying drawings which illustrate a non-limiting example of embodiment thereof, in which:

FIG. 1 is an axially sectioned view of a wheel-hub bearing unit according to the present invention;

FIG. 2 shows, cross-sectioned and on a larger scale, a detail of the wheel-hub bearing unit according to FIG. 1; and FIG. 3 shows, cross-sectioned and on a larger scale, a further detail of the wheel-hub bearing unit according to FIG. 1.

DETAILED DESCRIPTION

With reference to FIG. 1, 1 denotes overall a wheel-hub bearing unit which has a central axis X of rotation and comprises a wheel-hub bearing unit 10 of the first generation type in turn comprising:
- an outer bearing ring 11 which is stationary when in use and connected to a pillar (shown in broken lines and indicated by M) of a vehicle;
- a pair of radially internal bearing rings 12 which are not stationary when in use; and
- two rings 13 of rolling members 14 interposed between the outer ring 11 and the pair of inner rings 12 so as to rotatably and operatively connect a wheel (shown in broken lines and indicated by R) of the vehicle to the pillar M of the vehicle.

In the whole of the present description and in the accompanying claims, terms and expressions which indicate positions and directions such as "radial" and "axial" are to be understood as being in relation to the axis x of rotation. Expressions such as "axially internal" or "axially external" instead are to be understood as referring to a condition in which the wheel-hub bearing unit is mounted on a vehicle.

For the purposes of proper connection of the bearing 10 to the pillar M and to the wheel R, the unit 1 also comprises:
- a flanged wheel hub 20 which has an outer cylindrical assembly surface 21 for the pair of radially internal bearing rings 12 and which is directly connected when in use to the wheel R of the vehicle; and
- a flanged body 22 which, when in use, is connected directly to the pillar M and has an inner cylindrical assembly surface 23, which surface is a cylindrical assembly surface for the outer ring 11 and defines together with the outer cylindrical assembly surface 21 an assembly seat 24 for the bearing 10; and
- an axially reference element 25, i.e. a shoulder, which axially delimits the inner cylindrical assembly surface 23.

The pair of radially internal bearing rings 12 are keyed onto the outer cylindrical assembly surface 21 of the flanged wheel hub 20 which, when in use, is connected in a known manner to the wheel R of the vehicle, while the outer ring 11 is mounted axially adjacent to the shoulder 25 and in direct contact with the inner cylindrical assembly surface 23 of the flanged body 22, which is therefore connected, in a known manner, to the pillar M of the vehicle.

In the example of embodiment shown in FIG. 1, the outer ring 11, as well as the pair of inner rings 12, are made of bearing steel, which may also be tempered, so as to be able to withstand mechanical stresses which are typical of Hertzian contacts, while the flanged wheel hub 20, as well as the flanged body 22, are made of untempered steel, since they are not required to withstand the stresses typical of Hertzian contacts, having mainly the functions of structurally supporting the bearing 10.

Therefore, one of the main advantages which can be achieved with the wheel-hub bearing unit 1 according to the present invention is that, while the overall structural dimensions of the flanged wheel hub 20, as well as the overall structural dimensions of the flanged hub 22 may be modified depending on the application of the wheel-hub bearing unit 1, i.e. depending for example on the dimensions of the vehicle, without these modifications resulting in high production costs, the structural dimensions of the assembly seat 24, as well as the structural dimensions of the bearing 10 may remain unchanged, thereby allowing the use of the same wheel-hub bearing 10 of the first generation type irrespective as to the application of the wheel-hub bearing unit 1, considering the proven fact that in the wheel-hub bearing units of the known type the most critical part, i.e. that which is subject to the greatest wear and to the greatest static and dynamic stresses, is always the Hertzian part, i.e. the bearing, while the supporting part, i.e. the mechanical elements for connecting the bearing to wheel R and to the pillar M, even though being exposed to mechanical stresses typically associated with driving of a vehicle, is subject to a smaller degree of stress.

The above having been established, it is usually the case that, when designing the overall dimensions of a wheel-hub bearing unit based on the entire theoretical life cycle of the vehicle in question, the Hertzian part is provided with substantially larger dimensions than the supporting part as regards the stresses which both the parts must withstand during the working life of the bearing or, in theory, during the theoretical life cycle of the vehicle in question. Therefore, the wheel-hub bearing unit 1 according to the present invention offers the best advantages in particular in the "aftermarket", i.e. in the so-called Vehicle Service market, where only the theoretical remaining life cycle of the vehicle in question is involved and the bearing 10 may have mechanical resistance—in particular wear resistance—characteristics even inferior to those of the bearing used for the same application in the "original equipment" stage.

In order to improve further the flexibility and the impact from a cost point of view of the wheel-hub bearing unit 1 according to the present invention the unit 1 further comprises locking means 40 for axially locking the bearing 10 inside the assembly seat 24 in cooperation with the shoulder 25; in fact, once the bearing 10 is arranged, during assembly of the unit 1, inside the assembly seat 24 it is securely locked axially on one side, namely on the side with the shoulder 25, while it must also be locked on the axially opposite side, i.e. the side where it is inserted into the assembly seat 24, so as to prevent it from coming out subsequently, and this locking action must be performed in particular without the aid of the costly locking elements as mentioned above. Therefore, the locking means 40 are common to the outer bearing ring 11 and the flanged body 22 and comprise in combination:
- a shaped projection 41 arranged, preferably, but not necessarily, at the entrance of the assembly seat 24 along the inner cylindrical assembly surface 23 on the opposite side to the shoulder 25; and
- a shaped coupling groove 42 formed in an outer cylindrical surface 11a of the outer ring 11 and designed to be engaged by the shaped projection 41 when the bearing 10 is inside the assembly seat 24 and adjacent to the shoulder 25.

In particular, in the example of embodiment shown here, the shaped projection 41 is arranged at the entrance of the assembly seat 24 along the inner cylindrical assembly surface 23, but could be advantageously arranged at any axial point of the inner cylindrical assembly surface 23 depending on the necessary design conditions. In this case, the shaped coupling groove 42, instead of being axially open towards the outside of the bearing 10 as described and preferably illustrated here, will also be axially closed on both sides.

In accordance with that shown in detail in FIG. 2, the shaped projection 41 comprises an axially inner conical surface 43, i.e. arranged and axially oriented towards the inside of the assembly seat 24, and an axially outer conical surface 44, i.e. oriented towards the outside of the assembly seat 24, and a flat connection surface 45 between the two conical surfaces 43 and 44. Here and below "conicity" of a conical or frustoconical surface (i.e. of a conical surface truncated between two planes parallel to each other and perpendicular to an axis of symmetry of the conical surface about which its generating line rotates) must be understood as meaning the direction in which the generating line converges towards the axis X of rotation, i.e. the direction (or more correctly the sense) in which the vertex or apex of the conical surface, or of a cone delimited by the conical surface, is arranged.

In accordance with that shown in detail in FIG. 3, the shaped groove 42 comprises a conical engagement surface 46, oriented axially towards the outside of the assembly seat 24 from the surface 11a, and a respective flat surface 47, which extends axially along the outer ring 11 from the conical engagement surface 46 in a position axially lowered with respect to the surface 11a.

The inner conical surface 43 of the shaped projection 41 as well as the conical engagement surface 46 are inclined in relation to the axis X with the same orientation, are arranged adjacent to each other, and both define on the axis X an angle $\beta$ and, respectively, an angle $\alpha$ which have sizes which fall within a range not less than 15° and not more than 45° and in particular the angle $\alpha$ has a size larger than the size of the angle $\beta$. In fact, the angle $\alpha$ is formed on the outer ring 11 and on a material, as described above, consisting of tempered bearing steel and, since it has a size greater than the size of the angle β, which is formed on the flanged body 22 and on a material, as described above consisting of untempered steel, it has the effect that the conical engagement surface 46 rests with a sharp cutting edge on the axially inner conical surface 43 so as to substantially cut into the axially inner conical surface 43, offering a high degree of resistance to displacement or a high degree of resistance to loosening of the locking action provided by the locking means 40. Various experimental tests have shown that, if the sizes of the angle β and the angle α were to be less than 15°, the locking—or essentially engaging—action of the locking means 40 would not be effective, whereas, if the sizes of the angle β and the angle α were to be higher than 45°, the resistance to displacement would not increase further, such that the use of such large angles would be pointless.

For the purposes of facilitating both the insertion of the bearing 10 inside the assembly seat 24 and making the projection 42 sufficiently solid and resistant, i.e. also simple to produce by means of machining, the latter, i.e. the projection 42, has a radial height h from the inner cylindrical assembly surface 23 of not less than 0.02 mm and not more than 0.2 mm: for sizes smaller than 0.02 mm it would be particularly difficult to produce this machined projection 42 and it would not even be more effective for its intended purpose, while for sizes greater than 0.2 mm, the height h would be excessive, with the risk that the projection 42—which it is emphasized is made of untempered material—may be drawn during press-fitting of the bearing 10, the outer ring of which is made of tempered material.

Still with a view to facilitating both the insertion of the bearing 10 inside the assembly seat 24 and making the projection 42 sufficiently solid and resistant, the flat surface 45 has an axial length 1 of not less than 0.5 mm and not more than 2.5 mm. In particular, an axial length 1 of less than 0.5 mm would make the projection 42 not sufficiently robust either for the application loads which would tend to displace the bearing 10 or for withstanding press-fitting of the bearing 10; while an axial length 1 of more than 2.5 mm would make the projection 42 too long, weakening the interaction between the assembly seat 24 and the bearing 10.

Although an example of embodiment has been shown in the preceding detailed description, it must also be remembered that the embodiments shown constitute only examples and are not to be understood as limiting in any way the scope, the applicability or the configuration. The drawings and the detailed description preceding it will instead provide the persons skilled in the art with a convenient guideline for implementing the invention, it being understood that various changes may be made to the values described, without departing from the scope of the invention as defined in the attached claims and in their legal equivalents

What is claimed is:

1. A unit forming a wheel-hub bearing, the unit comprising:
a stationary outer bearing ring connected to a pillar of a vehicle,
a pair of fixed radially internal bearing rings,
two rings of rolling members interposed between the outer ring and the pair of radially internal bearing rings to rotatably and operatively connect a wheel of the vehicle to the pillar of the vehicle,
a flanged wheel hub that has an outer cylindrical assembly surface for the pair of radially internal bearing rings and that is connected to the wheel of the vehicle,
a flanged body that is connected directly to the pillar of the vehicle and has an inner cylindrical assembly surface for the outer ring, the inner cylindrical assembly surface and the outer cylindrical assembly surface together forming an assembly seat for the bearing, and an axial reference element that axially delimits the inner cylindrical assembly surface, further providing:
locking means for axially locking the bearing inside the assembly seat in cooperation with the axial reference element, wherein the locking means includes, in combination:
a shaped projection arranged along the inner cylindrical assembly surface, and
a shaped coupling groove hollowed out of an outer cylindrical surface of the outer ring designed to be engaged by the shaped projection, and wherein, in combination:
the shaped projection includes an inner conical surface that is oriented towards the inside of the assembly seat and an outer conical surface that is oriented towards the outside of the assembly seat, and a flat connection surface between the two conical surfaces,
the shaped groove further includes a conical engagement surface oriented towards the outside of the assembly seat, and
the outer conical surface of the shaped projection is inclined in relation to a central axis of rotation by a first angle and the conical engagement surface is inclined in relation to the central axis by a second angle that is larger than the first angle.

2. The wheel-hub bearing unit according to claim 1, wherein the shaped projection is arranged at the entrance of the assembly seat along the inner cylindrical assembly surface on the opposite side to the axial reference element.

3. The wheel-hub bearing unit according to claim 1, wherein the size of the first angle and the size of the second angle fall within a range not less than 15° and not more than 45°.

4. The wheel-hub bearing unit according to claim 3, wherein the radial height of the shaped projection from the inner cylindrical assembly surface is not less than 0.02 mm and not more than 0.2 mm.

5. The wheel-hub bearing unit according to claim 4, wherein the axial length of the flat surface of the shaped projection is not less than 0.5 mm and not more than 2.5 mm.

* * * * *